US006474134B1

(12) United States Patent
Takahashi et al.

(10) Patent No.: US 6,474,134 B1
(45) Date of Patent: Nov. 5, 2002

(54) METHOD FOR ADJUSTING SENSITIVITY OF ACCELERATION SENSOR

(75) Inventors: Hiroyuki Takahashi, Kasugai (JP); Kazuyoshi Shibata, Mizunami (JP); Hideki Andoh, Inuyama (JP)

(73) Assignees: NGK Insulators, Ltd., Nagoya (JP); NGK Optoceramics Co., Ltd., Nagoya (JP)

( * ) Notice: Subject to any disclaimer, the term of this patent is extended or adjusted under 35 U.S.C. 154(b) by 0 days.

(21) Appl. No.: 09/528,557

(22) Filed: Mar. 20, 2000

(30) Foreign Application Priority Data

Mar. 26, 1999  (JP) ............................................ 11-084894
Mar. 15, 2000  (JP) ...................................... 2000-073022

(51) Int. Cl.⁷ ............................ G01P 15/09; G01P 21/00
(52) U.S. Cl. ..................... 73/1.38; 73/514.34; 29/25.35; 29/595
(58) Field of Search ................................ 73/1.38, 1.37, 73/1.39, 514.34; 29/25.35, 595

(56) References Cited

U.S. PATENT DOCUMENTS

| 4,455,500 | A | * | 6/1984 | Savit et al. ............. 29/25.35 X |
| 4,586,377 | A | * | 5/1986 | Schmid .................... 73/1.38 X |
| 5,365,799 | A |   | 11/1994 | Okada ..................... 73/862.041 |
| 5,438,859 | A | * | 8/1995 | Yamashita et al. ... 73/514.34 X |
| 5,445,007 | A | * | 8/1995 | Varnham et al. ............. 73/1.37 |
| 5,473,930 | A | * | 12/1995 | Gademann et al. .......... 73/1.38 |
| 5,506,454 | A | * | 4/1996 | Hanzawa et al. .......... 307/10.1 |
| 5,606,128 | A | * | 2/1997 | Araki ...................... 73/1.38 X |
| 5,639,973 | A |   | 6/1997 | Okada et al. ........... 73/862.043 |
| 5,763,983 | A | * | 6/1998 | Asada ...................... 73/514.31 |
| 5,777,227 | A | * | 7/1998 | Cho et al. ................. 73/514.38 |
| 6,050,144 | A | * | 4/2000 | Otsuchi et al. .......... 73/1.38 X |
| 6,098,460 | A | * | 8/2000 | Otsuchi et al. .......... 73/514.34 |

FOREIGN PATENT DOCUMENTS

| DE | 4132414 A1 | * | 4/1993 | ................. 324/162 |
| EP | 62-250309 |   | 10/1987 | ............. G01P/9/04 |
| EP | 0 459 939 A1 |   | 12/1991 | ......... G01P/15/125 |
| EP | 523732 A2 | * | 1/1993 | .............. 73/514.34 |
| EP | 525549 A2 | * | 2/1993 | .............. 73/514.29 |
| EP | 689055 A1 | * | 12/1995 | .......... G01P/21/00 |
| EP | 0 731 357 A1 |   | 9/1996 | .......... G01P/15/09 |
| JP | 5-26744 |   | 2/1993 | .......... G01P/15/09 |
| JP | 9-21825 | * | 1/1997 | .......... G01P/15/09 |

* cited by examiner

*Primary Examiner*—Thomas P. Noland
(74) *Attorney, Agent, or Firm*—Burr & Brown

(57) ABSTRACT

The present invention provides a method for adjusting the sensitivity of an acceleration detecting device comprising a pair of piezoelectric elements, of an acceleration sensor device for detecting an externally acting acceleration. According to this method, electric charges produced in the pair of piezoelectric elements placed at positions being symmetric with respect to a weight are made to be equal to each other. The electric outputs of the piezoelectric elements are changed by varying the electrostatic capacity of the acceleration sensor device. Thus, noise sensitivity is suppressed.

22 Claims, 8 Drawing Sheets

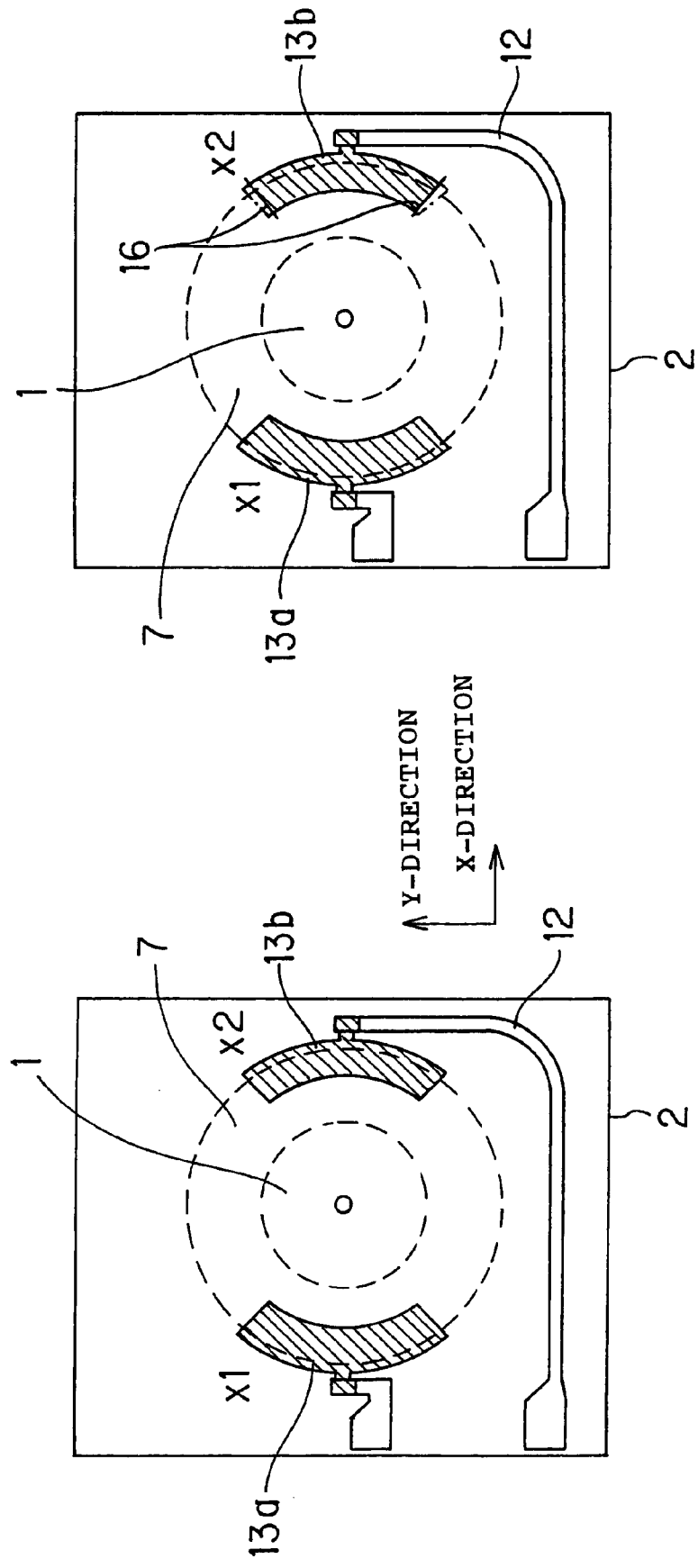

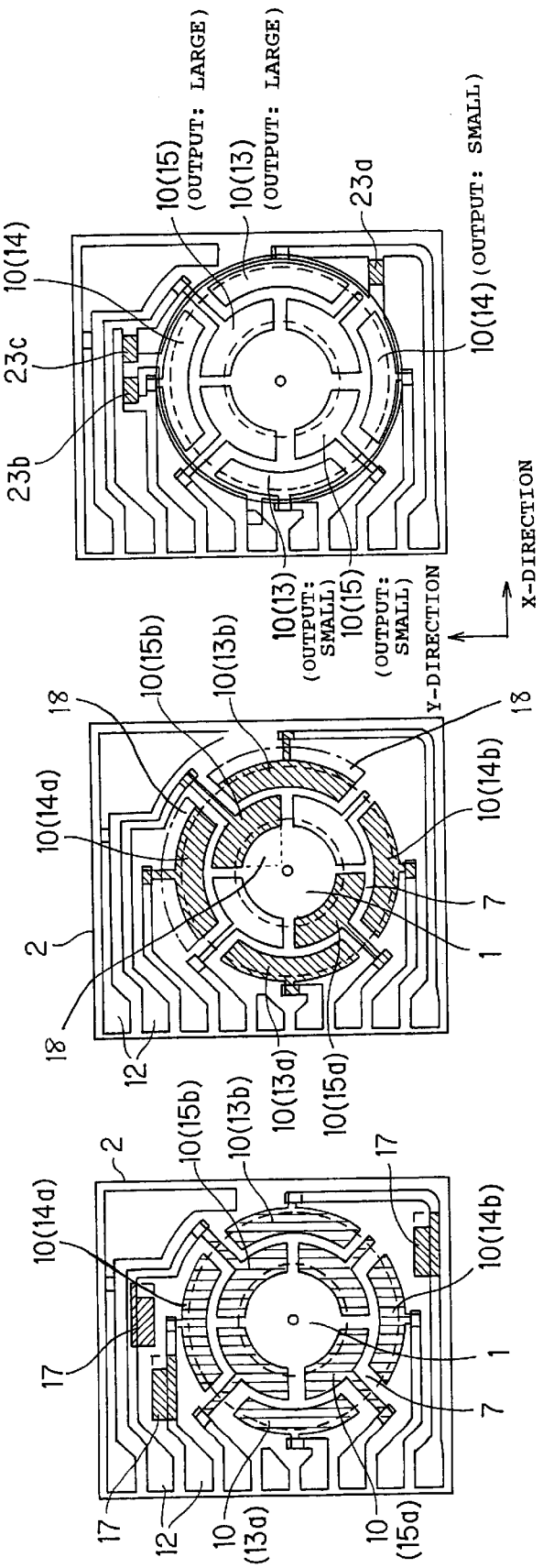

METHOD FOR ADJUSTING SENSITIVITY OF ACCELERATION SENSOR

FIELD OF THE INVENTION

The present invention relates to a method for adjusting the sensitivity of an acceleration detecting device capable of detecting at least one of components, which respectively correspond to the directions of three orthogonal axes, namely, the X-axis, Y-axis, and Z-axis, of an externally acting acceleration, which acts thereon.

BACKGROUND OF THE INVENTION

In the automobile and machine industries, there has been an increased demand for sensors capable of accurately detecting physical quantities, such as force, acceleration, and magnetism. Especially, compact sensors capable of detecting each of two-dimensional or three-dimensional components of such physical quantities are demanded.

For example, a sensor having a plurality of piezoelectric elements mounted on a flexible plate mounted on a flexible substrate having an operating member is disclosed in the Japanese Unexamined Patent Publication No. 5-26744.

This sensor is configured so that the flexible substrate deforms according to a physical quantity externally acting on the operating member. The direction and magnitude of the externally acting physical quantity are detected by a single acceleration detecting device in a three-dimensional manner on the basis of electric charges that are produced in the piezoelectric elements according to strain due to the deformation of the flexible substrate. FIG. 8 is a perspective diagram illustrating the concept of a coordinate system for a three-axis sensor.

This will be explained hereinbelow by taking an acceleration sensor device, which has an operating member as a weight, as an example of such a sensor device. In the case that an externally acting acceleration a is exerted on an acceleration detecting device as illustrated in FIGS. 2A and 2B, an inertial force f acts on a weight 1 in a direction opposite to the direction of the acceleration a. This inertial force f causes the deformation of a flexible substrate 3 put on the weight 1 and supports 2.

Electric charges according to the direction and magnitude of strain due to the deformation and according to the direction and magnitude of polarization of piezoelectric materials 5 put on the flexible substrate 3 are produced in the piezoelectric materials 5. Thus, the detection of the direction and magnitude of the externally acting acceleration is enabled by outputting the electric charges from upper electrodes 22x, 22y, and 22z, and a lower electrode 21 as electric signals.

The aforementioned acceleration detecting device is configured so that components of the externally acting acceleration, which respectively correspond to the directions of the X-axis, Y-axis, and Z-axis, are detected by a single acceleration detecting device as components. As a result, for example, even when the weight 1 undergoes the influence of the acceleration only in the direction of the Z-axis, as illustrated in FIG. 9B, the strain due to the deformation occurs not only in the piezoelectric element 20x for detecting the X-axis component of the acceleration, but in the piezoelectric element 20y (not shown in FIG. 9B) for detecting the Y-axis component of the acceleration. Consequently, electric charges are produced in the piezoelectric elements 20x and 20y.

The weight 1, however, does not undergo the influence of the acceleration only in the directions of the X-axis and Y-axis, so that it is necessary to prevent electric outputs of the electric charges produced in the piezoelectric elements 20x and 20y from being electrically outputted therefrom.

Thus, the aforementioned acceleration detecting device employs a method of electrically canceling the produced charges by configuring the pair of piezoelectric elements.

As illustrated in FIGS. 2A and 2B, a piezoelectric device, which corresponds to each of the X-axis, Y-axis, and Z-axis, of the acceleration detecting device comprises at least one pair of piezoelectric elements placed at positions that are symmetric with respect to the weight 1. Because of the symmetric positions of the pair of piezoelectric elements with respect to the weight 1, the amounts of strain of (that is, the amount of the electric charges respectively produced in) these piezoelectric elements of the pair are almost equal to each other. Furthermore, as shown in FIGS. 9A, 9B and 9C, polarization processing having the same magnitude is performed on the piezoelectric elements so that, among piezoelectric materials constituting the piezoelectric elements of the pairs, the piezoelectric materials to be used for detecting the X-axis component and Y-axis component of the acceleration have opposite polarities, and that the piezoelectric materials to be used for detecting the Z-axis component of the acceleration have the same polarity.

When the weight 1 is oscillated by such polarization processing in the direction of the Z-axis as illustrated in FIG. 9B, the electric charges of opposite polarities produced in the piezoelectric elements 20x for detecting the X-axis component and those 20y (not shown) for detecting the Y-axis component are canceled. Thus, no electric signals are outputted from these piezoelectric elements. On the other hand, when the weight 1 is oscillated in the directions of the X-axis or Y-axis the as illustrated in FIG. 9C, the electric charges produced in the piezoelectric elements 20z for detecting the Z-axis component are canceled, so that no electric signals are outputted from these elements 20z.

However, sometimes, the quantities of electric charges to be produced in the piezoelectric elements of the pair are not equal to each other owing to defective conditions at the time of forming the piezoelectric elements, for instance, variation in the electrode area of the piezoelectric elements, variation in the dielectric constant of the piezoelectric elements, a deviation of the position of the weight, and variation in deformation caused by the bending of the flexible substrate.

In such a case, the electric charges produced in the piezoelectric elements of the pair are not completely canceled but outputted therefrom as electrical signals. Thus, for example, the sensitivity in the direction of the X-axis is indicated despite the fact that the acceleration sensor device undergoes the influence of the acceleration only in the direction of the Z-axis (hereunder, such sensitivity will be referred to as "another axis noise").

It is necessary for ensuring the reliability of the sensor to limit the ratio of the other axis noise to the sensitivity in the direction of an axis to be detected (hereunder, such sensitivity will be referred to as "principal axis sensitivity") within a predetermined range (for instance, if the principal axis sensitivity is 100%, the other axis noise should be equal to or less than 5%). On the other hand, it is very difficult to limit the other axis noise within the predetermined range in the process of manufacturing acceleration sensor devices. Thus, there is the necessity for a method for calibrating the other axis noise of the sensor device after manufactured.

The present invention is accomplished in view of the aforementioned circumstances.

SUMMARY OF THE INVENTION

Accordingly, an object of the present invention is to provide a method for adjusting the sensitivity of an acceleration detecting device, according to which electrical outputs of piezoelectric elements of a pair of an acceleration detecting device are canceled by making the amounts of electric charges, which are respectively produced in a pair of piezoelectric elements placed at positions symmetric with respect to a weight, equal to each other, to thereby suppress the aforementioned other axis noise.

To achieve the foregoing object, according to the present invention, there is provided a method for adjusting sensitivity of an acceleration sensor device having an acceleration detecting device consisting of a pair of piezoelectric elements for detecting an externally acting acceleration. This method includes the step of changing an electric output of the piezoelectric elements by changing electrostatic capacity of the acceleration sensor device. In the case of this method, the acceleration sensor device having an acceleration detecting device may comprises a weight, a support that is installed around said weight and has a hollow portion, a flexible substrate positioned on the support so that the weight is suspended in the hollow portion of said support, and a pair of piezoelectric elements.

In the case of the method of the present invention, if the acceleration detecting device is adapted to detect an acceleration component in the X-direction or Y-direction, the electrostatic capacity may be changed so that the difference between the absolute values of excitation outputs respectively generated in the piezoelectric elements of the acceleration detecting device becomes small when the acceleration sensor device is oscillated in the Z-direction. If the acceleration detecting device is adapted to detect an acceleration component in the Z-direction, the electrostatic capacity may be changed so that the difference between the absolute values of excitation outputs respectively generated in the piezoelectric elements of the acceleration detecting device becomes small when the acceleration sensor device is oscillated in the X-direction or Y-direction.

In the case of the method of the present invention, two pairs of the piezoelectric elements may be provided in said acceleration sensor device correspondingly to two orthogonal axes. In the case of the method of the present invention, three pairs of the piezoelectric elements may be provided in said acceleration sensor device correspondingly to three orthogonal axes.

Further, in the case of the method of the present invention, if the acceleration detecting device consisting of the pair of piezoelectric elements is adapted to detect an acceleration component in the X-direction, the electrostatic capacity may be changed so that the shapes of the piezoelectric elements are symmetric with respect to the X-axis and so that the difference between the absolute values of excitation outputs respectively generated in the piezoelectric elements of the acceleration detecting device becomes small when the acceleration sensor device is oscillated in the Z-direction. If the acceleration detecting device consisting of the pair of piezoelectric elements is adapted to detect an acceleration component in the Y-direction, the electrostatic capacity may be changed so that the difference between the absolute values of excitation outputs respectively generated in the piezoelectric elements of the acceleration detecting device becomes small when the acceleration sensor device is oscillated in the Z-direction.

According to the present invention, the electrodes respectively corresponding to the piezoelectric elements of the pair for detecting an acceleration component in the Z-direction which should undergo trimming processing may be determined according to whether or not an excitation output generated in the piezoelectric elements for detecting an acceleration component in the Z-direction and an excitation output generated in the piezoelectric elements for detecting an acceleration component in the X-direction are different in sign from each other when the acceleration sensor device is oscillated in the X-direction, and according to whether or not an excitation output generated in the piezoelectric elements for detecting an acceleration component in the Z-direction and an excitation output generated in the piezoelectric elements for detecting an acceleration component in the Y-direction are different in sign from each other when the acceleration sensor device is oscillated in the Y-direction.

Further, according to the present invention, an adjusting capacitance, which is connected to an electrode corresponding to each of the piezoelectric elements of the pair, may be formed at a portion which corresponds to the support of a piezoelectric material of a corresponding one of the piezoelectric elements of the pair. Furthermore, trimming processing may be performed on the adjusting capacitance instead of performing trimming processing on the electrode. In this case, preferably, the adjusting capacitance is connected to an electrode corresponding to the piezoelectric element, which has a larger excitation output, of the pair between the piezoelectric elements of the pair, whose excitation outputs are made to be different from each other.

Furthermore, according to the present invention, a part of the electrode may be placed at a portion, which corresponds to said support or to an operating member, of a piezoelectric material corresponding to one of the piezoelectric element of the pair. Further, trimming processing may be performed at the part of the electrode. In this case, preferably, an electrode corresponding to the piezoelectric element which has a larger excitation output between the pair of the piezoelectric elements whose excitation outputs are made to be different from each other, has a part placed on a portion which corresponds to the support or to the operating member of the piezoelectric material. Moreover, the electrode may be formed like a comb and may have bottom land portions each formed on the portion which corresponds to the support or to the operating member of the piezoelectric material, and may have tooth-like portions each projecting from a corresponding one of the bottom land portions and each extending from a portion which corresponds to the hollow portion of the piezoelectric material. The bottom land portions provided between adjacent ones of said tooth-like portions maybe cut by performing trimming processing.

Furthermore, trimming processing may be performed on a portion which is provided at the side of the operating member or of the support of the electrode along the circumference of a circle, the center of which is an origin (O). Alternatively, trimming processing may be performed on the electrode along a line segment connecting an origin (O) to a point provided on the circumference of a circle, the center of which is the origin (O).

BRIEF DESCRIPTION OF THE DRAWINGS

Other features, objects and advantages of the present invention will become apparent from the following description of preferred embodiments with reference to the drawings in which like reference characters designate like or corresponding parts throughout several views, and in which:

FIG. 3A is a plan diagram illustrating the three-axis sensor before trimming is performed thereon according to an embodiment of the method for adjusting the sensitivity of an acceleration sensor device of the present invention;

FIG. 3B is a plan diagram illustrating the three-axis sensor after trimming is performed thereon according to this embodiment of the method for adjusting the sensitivity of an acceleration sensor device of the present invention;

FIGS. 5A, 5B, and 5C are plan views of a three-axis sensor, which illustrate trimming processing according to another embodiment of the method for adjusting the sensitivity of an acceleration sensor device of the present invention;

DETAILED DESCRIPTION OF THE INVENTION

Figure 1A:
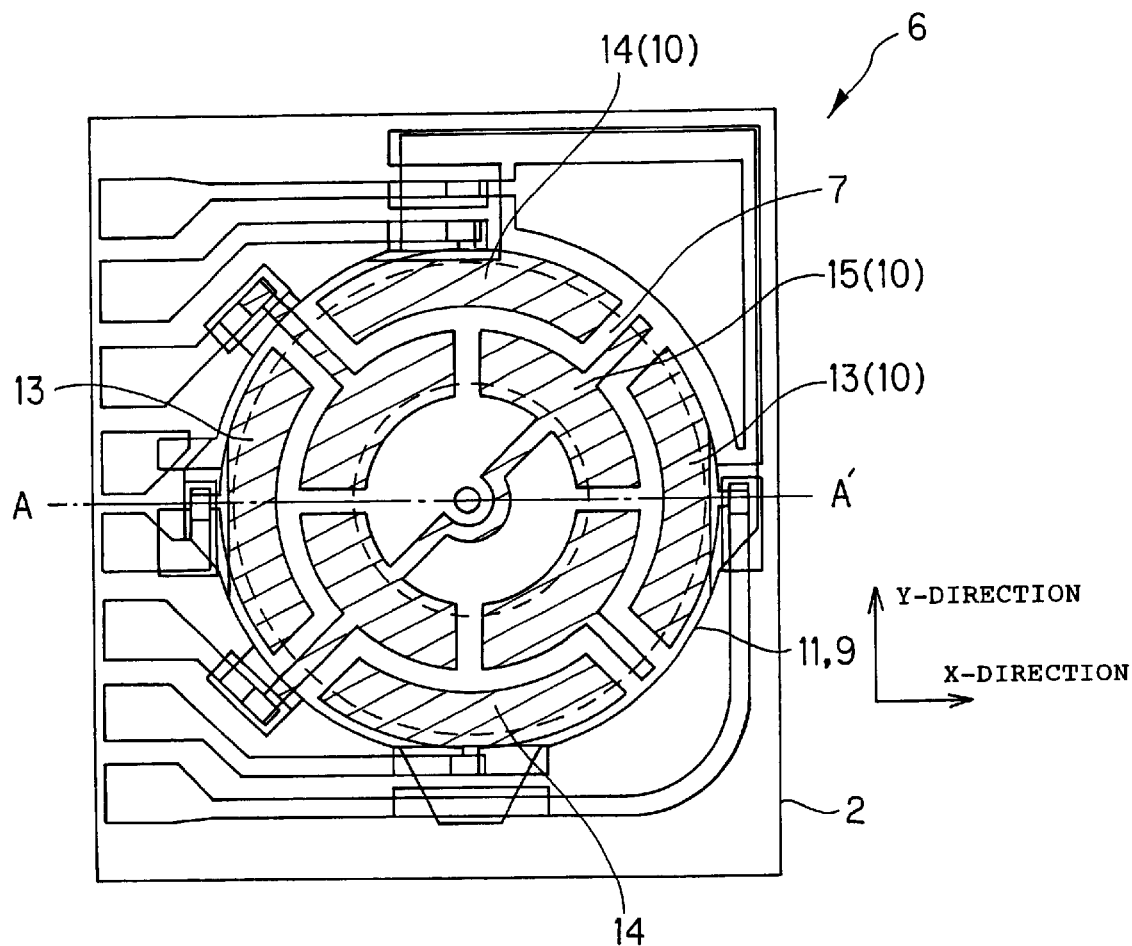
FIG. 1A is a plan diagram showing the general configuration of a three-axis sensor.

According to the present invention, the electric outputs of the piezoelectric elements are changed by varying the electrostatic capacity of the acceleration sensor device. Thus, noise to the acceleration sensor device is reduced. Incidentally, the term "piezoelectric element" is defined as a portion of the piezoelectric material which is sandwiched between upper and lower electrodes in the upward or downward direction thereof. Practically, in the case of using a pair of electrodes separated from each other, trimming processing is performed thereon so that the shapes of the electrodes of the pair are axially symmetric with respect to a same straight line passing through the center of the hollow portion.

Furthermore, in the case that such electrodes compose a device for detecting an acceleration component in the X-direction or Y-direction, trimming processing is performed on thereon so that the difference between the absolute values of excitation or oscillation outputs respectively generated in the piezoelectric elements of the pair becomes small when the device is oscillated in the Z-direction. On the other hand, in the case that such electrodes compose a device for detecting an acceleration component in the Z-direction, trimming processing is performed on thereon so that the difference between the absolute values of excitation or oscillation outputs respectively generated in the piezoelectric elements of the pair becomes small when the device is oscillated in the X-direction or Y-direction. Further, in the case of employing a pair of electrodes that are connected to each other and that constitute a device for detecting an acceleration component in the Z-direction, trimming processing is performed on thereon so that the difference between the absolute values of excitation or oscillation outputs respectively generated in the piezoelectric elements of the pair becomes small when the device is oscillated in the X-direction or Y-direction. Incidentally, it is desirable that the difference between the absolute values of excitation outputs is not more than 5%.

This will be explained hereinbelow by taking a three-axis sensor, which has devices each including a pair of electrodes separated from each other, corresponding to the X-direction and Y-direction, and which has a device including a pair of electrodes connected to each other corresponding to the Z-direction, as an example.

In the case of such a three-axis sensor, trimming processing is performed on the electrodes corresponding to the X-direction so that the shape of the electrodes 13 corresponding to the X-direction is axially symmetric with respect to the X-axis, as illustrated in FIG. 3B, and so that the difference between the absolute values of the excitation outputs generated respectively in the elements of the pair corresponding to the X-direction becomes small when the device is oscillated in the Z-direction.

Preferably, the elements corresponding to the X-direction is adapted to detect only a component force in the X-direction. Thus, it is necessary to reduce noise due to the detection of component forces in the Y-direction and Z-direction. Further, the purpose of making the shape of the pair of the electrodes 13 corresponding to the X-direction axially symmetric with respect to the X-axis is to reduce noise due to the component force in the Y-direction. That is, the direction of strain caused in the piezoelectric materials when oscillated in the Y-direction varies with and has opposite signs respectively corresponding to the sides of the X-axis. Conversely, the direction of polarization of one of the electrodes 13 of the pair corresponding to the X-direction is the same direction of polarization. Thus, the signs of the electric charges are determined by the direction of the deformation. Therefore, the electric charge generated in each of the electrodes of the pair can be approximately zero. Consequently, noise due to the component force in the Y-direction can be decreased.

Further, the purpose of making the difference between the absolute values of the excitation outputs generated in the elements of the pair corresponding to the X-direction small is to reduce noise caused due to the component force in the Z-direction in the elements corresponding to the X-direction.

The signs or polarities of the electric charges produced in the elements are determined by a product of the direction of polarization and the direction of deformation of the elements. Further, the directions of polarization of the elements of the pair corresponding to the X-direction are opposite to each other. On the other hand, the excitation output of the elements is given by (Q/C) where Q denotes an amount of electric charge produced in each of the elements, and C designates the capacitance thereof. When oscillated in the Z-direction, the deformations caused in the piezoelectric materials of the elements of the pair corresponding to the X-direction have the same direction. As a result, the electric charges produced in the elements of the pair corresponding to the X-direction have opposite sign or polarities.

Therefore, the signs of the excitation outputs of the elements of the pair corresponding to the X-direction are different from each other. Consequently, the excitation output of the entirety of the device corresponding to the X-direction should be canceled. Namely, the device corresponding to the X-direction should generate no excitation output. However, actually, there is a difference between the absolute values of the excitation outputs of the elements owing to the difference in the amount of produced electric charge between the elements of the pair corresponding to the X-direction. This results in generation of noise corresponding to the other axes.

That is, as described in TABLE 1 listed below, when the amount of electric charge produced in one of the elements 13$a$ of the pair corresponding to the X-direction (hereunder also indicated by "X1") before trimming is Q, the amount of electric charge produced in the other element 13$b$ (hereunder also indicated by "X2") is $-(Q+\Delta Q)$. Further, the excitation output of the element X1 (13$a$) is Q/C1 where C1 designates the capacitance of the element X1. Furthermore, the excitation output of the element X2 (13$b$) is $-(Q+\Delta Q)/(C2+\Delta C)$ where $(C2+\Delta C)$ denotes the capacitance of the element X2. Therefore, the total amount of electric charge generated in the entire device corresponding to the X-direction is $-\Delta Q$. The capacitance of the entire device is $C1+C2+\Delta C$. Consequently, noise corresponding to the excitation output, which is $-\Delta Q/(C1+C2+\Delta C)$, of the entire device corresponding to the X-direction are produced.

TABLE 1

| | Acceleration-in-X-direction Detecting Device | | |
|---|---|---|---|
| | X1 | X2 | Total |
| Polarization Direction | + | − | |
| Deformation Direction | + | + | |
| Produced Charge | Q | $-(Q + \Delta Q)$ | $-\Delta Q$ |
| Capacitance | C1 | $C2 + \Delta C$ | $C1 + C2 + \Delta C$ |
| Excitation Output | Q/C1 | $-(Q + \Delta Q)/(C2 + \Delta C)$ | $-\Delta Q/(C1 + C2 + \Delta C)$ |

Thus, in the case of the method of the present invention, as described in TABLE 2 listed below, the amount of electric charge generated in and the capacitance of the device corresponding to the X-direction are adjusted by performing trimming processing. Thus, the difference between the absolute values of the excitation outputs of the elements of the pair of the device corresponding to the X-direction are made to be small. Consequently, when oscillated in the Z-direction, the excitation output of the entire device corresponding to the X-direction is 0. Further, the noise due to the component force in the Z-direction is reduced. Because the electrodes of the pair corresponding to the X-direction are separated from each other, the amount of electric charges generated in and the capacitance of the elements of the pair of the device corresponding to the X-axis can be individually measured. Thus, trimming processing is performed according to the measurement values thereof.

TABLE 2

| | Acceleration-in-X-direction Detecting Device | | |
|---|---|---|---|
| | X1 | X2 | Total |
| Polarization Direction | + | − | |
| Deformation Direction | + | + | |
| Produced Charge | Q | −Q | 0 |
| Capacitance | C1 | C2 | C1 + C2 |
| Excitation Output | Q/C1 | −Q/C2 | 0 |

Incidentally, when oscillated in the X-direction, the directions of deformations respectively caused in the elements of the pair of the device corresponding to the X-direction are opposite to each other. Moreover, as described above, the directions of polarization of such elements are opposite to each other. Thus, the electric charges respectively produced in such elements have the same sign or polarity, so that the excitation outputs of such elements are not canceled and can be measured.

Further, according to the present invention, trimming processing is performed on the electrodes corresponding to the Y-direction so that the shape of the electrodes corresponding to the Y-direction is axially symmetric with respect to the Y-axis, and so that the difference between the absolute values of the excitation outputs generated respectively in the elements of the pair corresponding to the Y-direction becomes small when the device is oscillated in the Z-direction.

Preferably, the elements corresponding to the Y-direction is adapted to detect only a component force in the Y-direction. Thus, it is necessary to reduce noise due to the detection of component forces in the X-direction and Z-direction. Further, the purpose of making the shape of the pair of the electrodes corresponding to the Y-direction axially symmetric with respect to the Y-axis is to reduce noise due to the component force in the X-direction. Further, the purpose of making the difference between the absolute values of the excitation outputs generated in the elements of the pair corresponding to the Y-direction small when oscillated in the Z-direction is to reduce noise caused due to the component force in the Z-direction in the elements corresponding to the Y-direction. For the same reason as in the case of the device corresponding to the X-direction, the noise caused corresponding to the axes other than the excitation axis can be reduced. Because the electrodes of the pair corresponding to the Y-direction are separated from each other, the amount of electric charges generated in and the capacitance of the elements of the pair of the device corresponding to the Y-axis can be individually measured. Thus, trimming processing is performed according to the measurement values thereof.

Furthermore, according to the present invention, trimming processing is performed on the electrodes corresponding to the Z-direction so that the difference between the absolute values of the excitation outputs generated respectively in the elements of the pair corresponding to the X-direction or Y-direction becomes small when the device is oscillated in the X-direction or Y-direction. The purpose of this is to reduce noise produced due to the component force in the X-direction or Y-direction in the elements corresponding to the Z-direction.

The signs or polarities of the electric charges produced in the elements are determined, as described above, by a product of the direction of polarization and the direction of deformation of the elements. Further, the directions of polarization of the elements of the pair corresponding to the Z-direction are the same one. When oscillated in the X-direction or Y-direction, the directions of deformations caused in the piezoelectric materials of the elements of the pair corresponding to the Z-direction are opposite to each other. As a result, the electric charges produced in the elements of the pair corresponding to the Z-direction have opposite sign or polarities. Therefore, the signs of the excitation outputs of the elements of the pair corresponding to the Z-direction should be canceled. That is, the device corresponding to the Z-direction should generate no excitation output. However, actually, there is a difference between the absolute values of the excitation outputs of the elements owing to the difference in the amount of produced electric charge between the elements of the pair corresponding to the Z-direction. This results in generation of noise corresponding to the other axes. Namely, as described in TABLE 3 listed below, for instance, when oscillated in the X-direction, if the amount of electric charge produced in one (hereunder also indicated by "Z1") of the elements of the pair 15b corresponding to the Z-direction before trimming is Q', the amount of electric charge produced in the other element 15a (hereunder also indicated by "Z2") is $-(Q'+\Delta Q)$. Further, the excitation output of the element Z1 (15b) is Q'/C3 where C3 designates the capacitance of the element Z1. Furthermore, the excitation output of the element Z2 (15a) is $-(Q'+\Delta Q)/(C4+\Delta C)$ where $(C4+\Delta C)$ denotes the capacitance of the element Z2. Therefore, the total amount of electric charge generated in the entire device corresponding to the Z-direction is $-\Delta Q$. The capacitance of the entire device is $C3+C4+\Delta C$. Consequently, noise corresponding to the excitation output, which is $-\Delta Q/(C3+C4+\Delta C)$, of the entire device corresponding to the Z-direction is reduced.

TABLE 3

|  | Acceleration-in-Z-direction Detecting Device | | | Acceleration-in-X-direction Detecting Device | | |
| --- | --- | --- | --- | --- | --- | --- |
|  | Z1 | Z2 | Total | X1 | X2 | Total |
| Polarization Direction | + | + |  | + | − |  |
| Deformation Direction | + | − |  | + | − |  |
| Produced Charge | Q' | $-(Q'+\Delta Q)$ | $-\Delta Q$ | Q | Q | 2Q |
| Capacitance | C3 | $C4+\Delta C$ | $C3+C4+\Delta C$ | C1 | C2 | C1 + C2 |
| Excitation Output | Q'/C3 | $-(Q'+\Delta Q)/(C4+\Delta C)$ | $-\Delta Q/(C3+C4+\Delta C)$ | Q/C1 | Q/C2 | 2Q/(C1 + C2) |

Hence, in the case of the method of the present invention, as described in TABLE 4 listed below, the amount of electric charge generated in and the capacitance of the device corresponding to the Z-direction are adjusted by performing trimming processing on the electrodes corresponding to the Z-direction. Thus, the difference between the absolute values of the excitation outputs of the elements of the pair of the device corresponding to the Z-direction are made to be small. Consequently, when oscillated in the X-direction or Y-direction, the excitation output of the entire device corresponding to the Z-direction is 0. Moreover, the noise due to the component force in the X-direction or Y-direction is reduced.

TABLE 4

|  | Acceleration-in-Z-direction Detecting Device | | |
| --- | --- | --- | --- |
|  | Z1 | Z2 | Total |
| Polarization Direction | + | + |  |
| Deformation Direction | + | − |  |
| Produced Charge | Q' | −Q' | 0 |
| Capacitance | C3 | C4 | C3 + C4 |
| Excitation Output | Q'/C3 | −Q'/C4 | 0 |

Figure 4A:
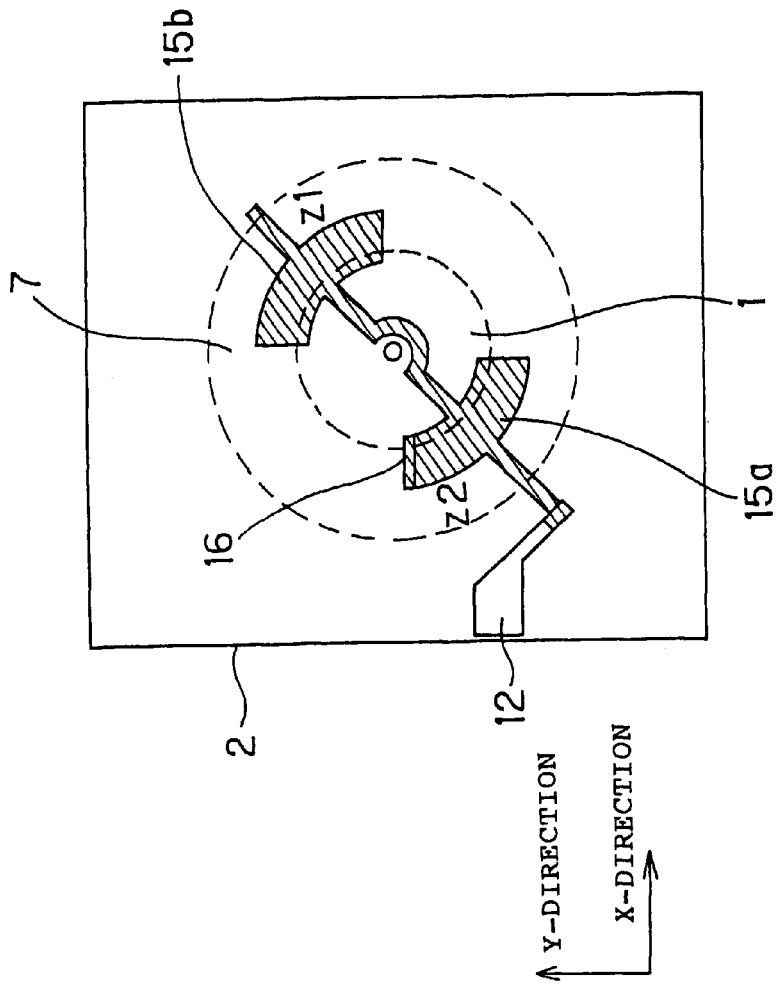
FIG. 4A is a plan diagram illustrating the three-axis sensor before trimming is performed thereon according to another embodiment of the method for adjusting the sensitivity of an acceleration sensor device of the present invention.
Figure 4B:
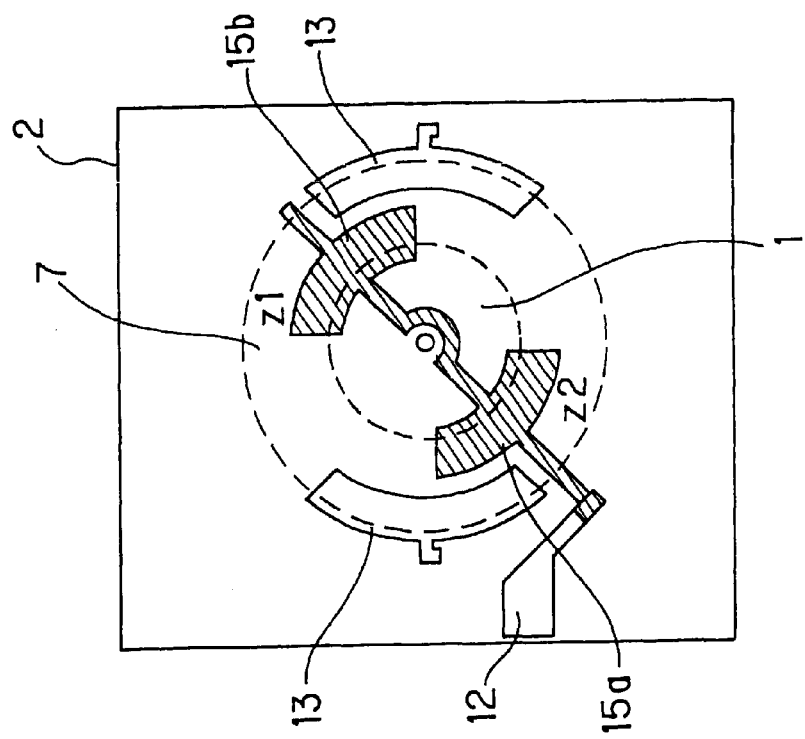
FIG. 4B is a plan diagram illustrating the three-axis sensor after trimming is performed thereon according to another embodiment of the method for adjusting the sensitivity of an acceleration sensor device of the present invention.

Preferably, trimming processing of the electrodes corresponding to the Z-direction is performed on edge portions thereof in the vicinity of the electrodes 13 corresponding to the X-direction, as illustrated in FIG. 4B, when noise produced due to the component force in the X-direction are reduced. The reason for this is that when oscillated in the X-direction, deformation caused in the electrodes corresponding to the Z-axis is large in the vicinity of the X-axis, while deformation caused in these electrodes is small. Namely, almost no deformation is caused therein in the proximity of the Y-axis. Therefore, trimming processing performed in the edge portions thereof in the vicinity of the electrodes 13 corresponding to the X-direction has little influence on the Y-axis. Moreover, trimming thereof is achieved with high sensitivity. Furthermore, similarly, in the case of reducing noise caused owing to the component force in the Y-direction, it is preferable to perform trimming processing of the electrodes corresponding to the Z-direction in the edge portions thereof in the vicinity of the electrodes corresponding to the Y-direction.

Electrodes of the pair corresponding to the Z-direction are connected to each other. Thus, the excitation outputs of the elements of the pair corresponding to the Z-direction cannot be individually measured. It is determined in the following manner which of these elements undergoes trimming processing. First, the amounts of electric charges respectively produced in the entire device corresponding to the Z-direction and the entire device corresponding to the X-direction when oscillated in the X-direction are obtained. Then, the signs or polarities of the electric charges are compared with each other. If the electric charges have the same sign, trimming processing is performed on the element Z1. Conversely, if the electric charges have opposite signs, trimming processing is performed on the element Z2. That is, if $\Delta Q$ is positive, $Q'<Q'+\Delta Q$. Therefore, the amount of the electric charge produced in the element Z2 is larger than that of the electric charge produced in the element Z1. Thus, trimming processing is performed on the element Z2.

Conversely, if $\Delta Q$ is negative, $Q'>Q'+\Delta Q$. Therefore, the amount of the electric charge produced in the element Z1 is larger than that of the electric charge produced in the element Z2. Thus, trimming processing is performed on the element Z1. For example, as described in TABLE 3, the electric charge generated in the entire device corresponding to the Z-direction when oscillated in the X-direction is $-\Delta Q$. Further, the electric charge generated in the entire device corresponding to the X-direction when oscillated in the X-direction is 2Q. Thus, the amounts of the electric charges respectively generated in these devices have opposite signs. Therefore, as illustrated in FIG. 4B, trimming processing is performed on the electrode Z2 (15a) corresponding to the Z-direction.

Incidentally, when oscillated in the Z-direction, the directions of deformations respectively generated in the elements of the pair corresponding to the Z-direction are the same one. Further, as described above, these elements are polarized in the same direction. Thus, the electric charges respectively produced in these elements have the same sign or polarity. Consequently, the excitation outputs of these elements can be measured.

According to the present invention, trimming processing may be performed on an adjusting capacitance or capacitor 17 that is connected to the upper electrodes 10 and formed on a portion of the piezoelectric material, which corresponds to the support 2, as illustrated in FIG. 5A, without performing trimming processing directly onto the electrodes. The trimming of the adjusting capacitance 17 formed on the support 2 avoids difficulty in performing trimming processing on the electrodes formed on a thin flexible substrate by using a laser.

Furthermore, according to the present invention, as illustrated in FIG. 5C, the sensitivity of the sensor device may be adjusted by providing electrodes, to which parts can be soldered, in each of a group of the upper electrodes 22 and a group of the lower electrodes 21 of larger excitation output piezoelectric element 20, then soldering chip capacitors 23 (namely, an X-direction trimming capacitor 23a, a Y-direction trimming capacitor 23b, and a Z-direction trimming capacitor) to such electrodes, and increasing the capacitance.

In this case, a difference is preliminarily provided between the excitation outputs of the piezoelectric elements of the pair. The adjusting capacitance 17 is connected to the element whose excitation output is larger than that of the other element when no trimming capacitors are provided. This is because of the fact that the excitation output decreases when the trimming capacitors producing no electric charge are added thereto, and that thus, the capacity of the trimming capacitors adjusts a decrease in the excitation output. Incidentally, in this case, the excitation output is a voltage, which is determined by a ratio (Q/C) of the produced electric charge Q to the capacitance C. For instance, in the case illustrated in FIG. 5A, the adjusting capacitance 17 is connected to the electrodes 13b, 14a, and 15b, respectively corresponding to the X-direction, Y-direction, and Z-direction, each of which is the element having a larger excitation output in the case where no trimming capacitors are provided therein.

Further, according to the present invention, as illustrated in FIG. 5B, the upper electrodes 10 may have unusually large projection parts 18 projected therefrom to parts, which correspond to and are placed on the support 2 and the operating member 1, of the piezoelectric materials. This avoids difficulty in performing trimming processing on the electrodes formed on a thin flexible substrate by using a laser. In this case, a difference is preliminarily provided between the excitation outputs of the piezoelectric elements of the pair. Preferably, one of these element, which provides a larger excitation output if no unusually large projection portion is provided therein, have a projection portion that is larger than an ordinary projection and that is disposed on a part, which corresponds to the support or the operating member, of the piezoelectric material. The excitation output decreases when the projection portions producing no electric charge are added thereto, while the excitation output increases when the area (or capacity) of the projection portions is decreased by trimming processing. Thus, the size of each of the projection portions is adjusted so that a desired excitation output is obtained. Incidentally, in this case, the excitation output is a voltage, which is determined by a ratio (Q/C) of the produced electric charge Q to the capacitance C. Further, a large amount of electric charge is produced in the projection portion located in the very neighborhood of the flexible substrate. Therefore, to detect such electric charge, a projection portion is usually formed in the sensor.

For instance, in the case illustrated in FIG. 5B, the electrodes 13b, 14a, and 15b, respectively corresponding to the X-direction, Y-direction, and Z-direction, each have the unusually large projection portion and each is the element having a larger excitation output in the case where no unusually large projection portion is provided therein.

Figure 6:
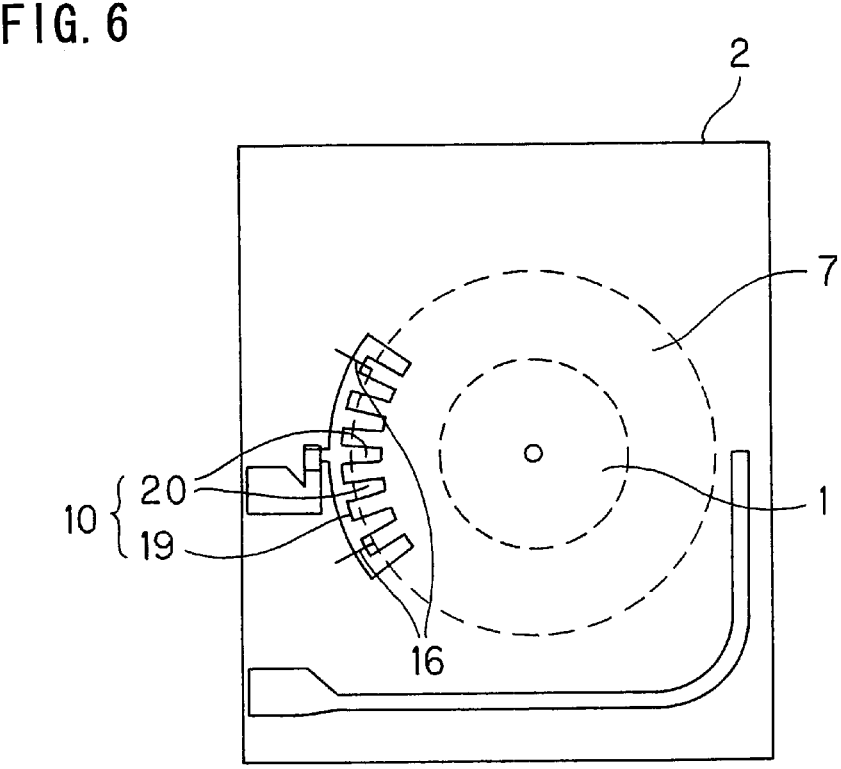
FIG. 6 is a plan view of a three-axis sensor, which illustrates trimming processing according to another embodiment of the method for adjusting the sensitivity of an acceleration sensor device of the present invention.

Furthermore, as illustrated in FIG. 6, each of the upper electrodes 10 may be formed like a comb, and have bottom land portions 19, which are provided on parts of the piezoelectric material corresponding to the support 1 and the operating member 1, and tooth-like portions 20, which project from the bottom land portions and to a part corresponding to the hollow portion 7. Moreover, the bottom land portions each provided between adjacent tooth-like portions may be cut by trimming processing. This avoids difficulty in performing trimming processing on the electrodes formed on a thin flexible substrate by using a laser. Furthermore, this has an advantage in that efficient adjustment is achieved by employing a width of one tooth-like portion as a minimum unit for adjustment. Additionally, this has another advantage in that the sensor itself can be compact, as compared with the case of providing the adjusting capacitance.

Figure 7:
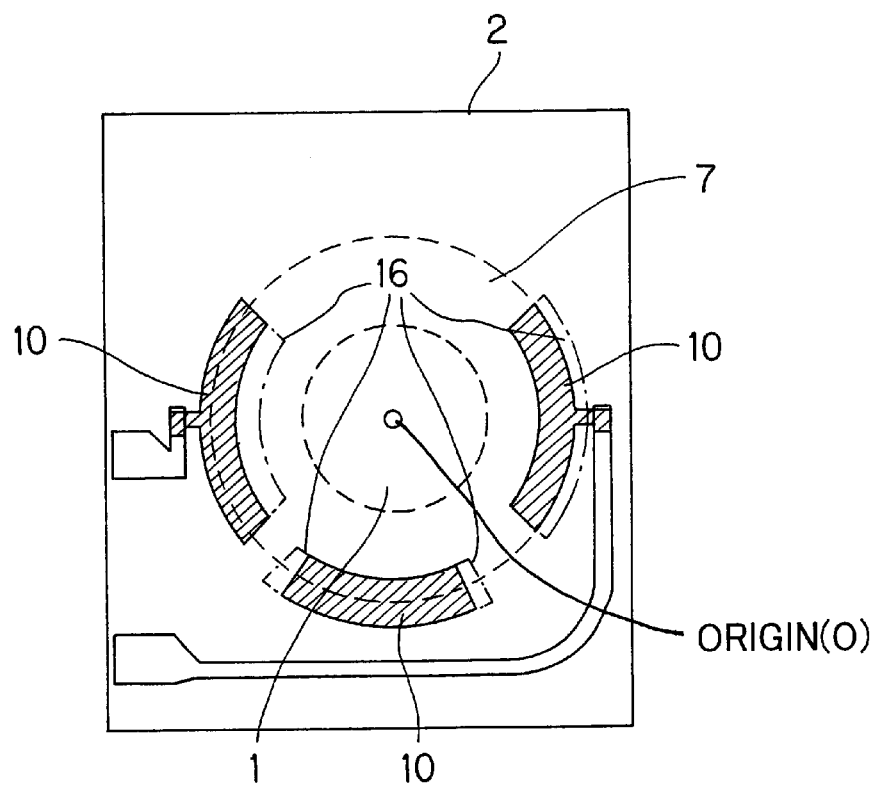
FIG. 7 is a plan view of a three-axis sensor, which illustrates trimming processing according to another embodiment of the method for adjusting the sensitivity of an acceleration sensor device of the present invention.
Figure 8:
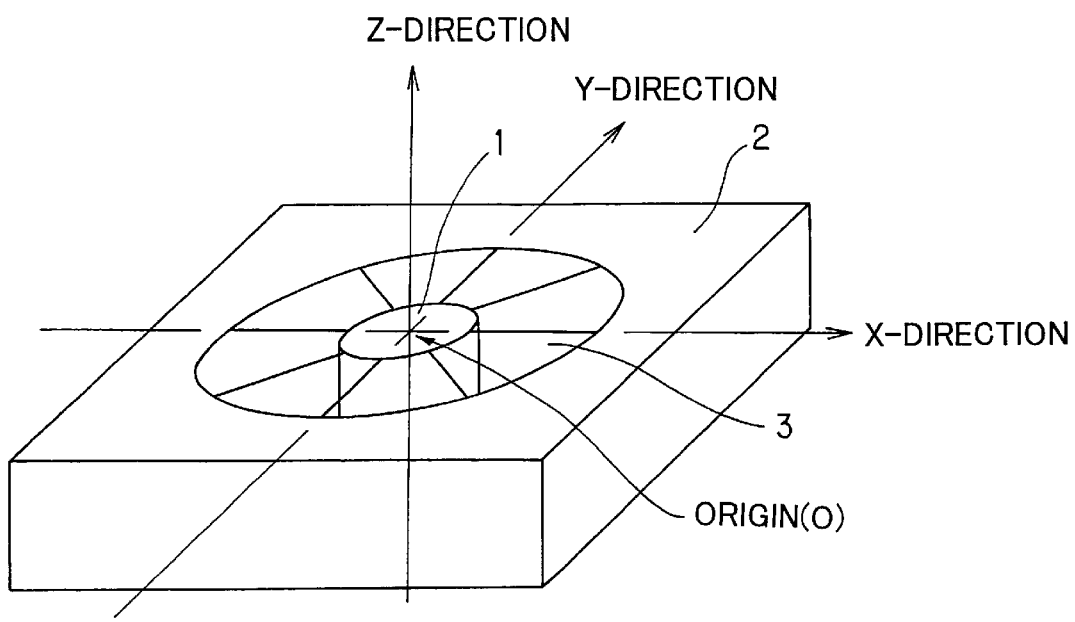
FIG. 8 is a perspective diagram illustrating the concept of a coordinate system for a three-axis sensor.
Figure 9A:
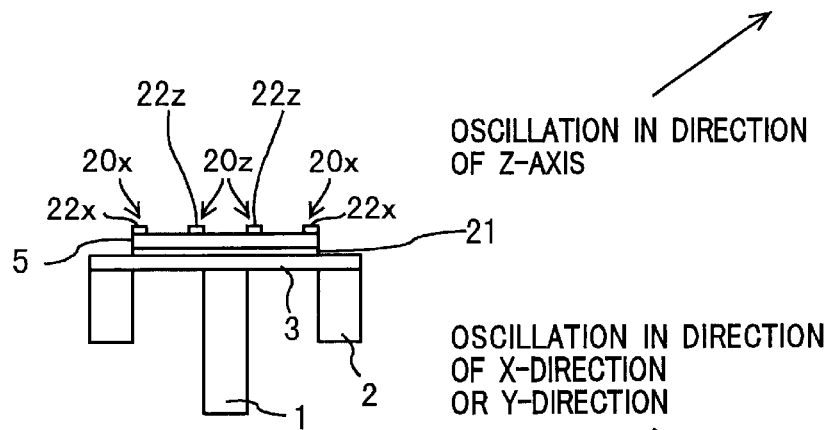
FIGS. 9A, 9B, and 9C are longitudinally sectional diagrams illustrating operations of a three-axis sensor.
Figure 9B:
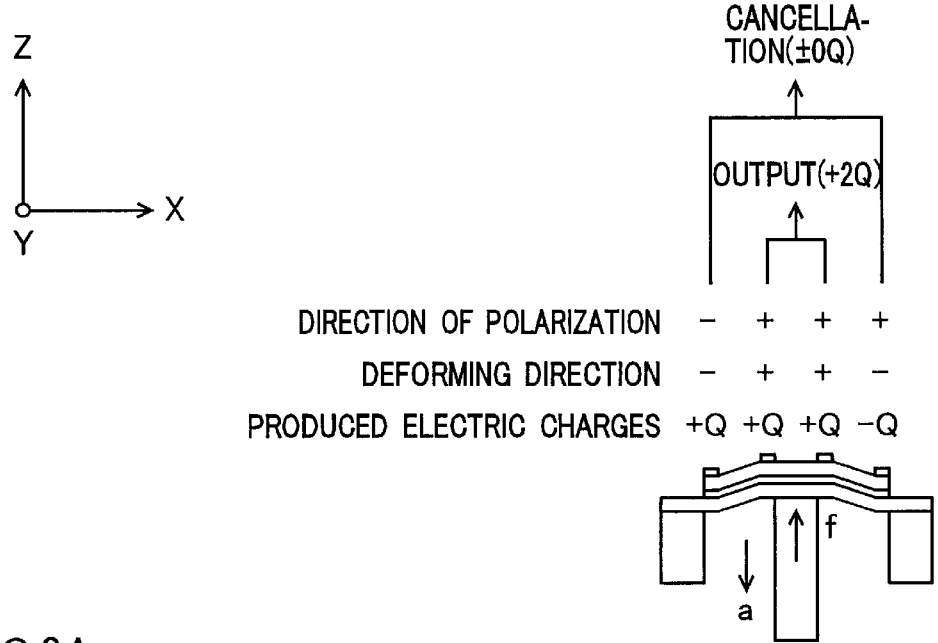
Figure 9C:
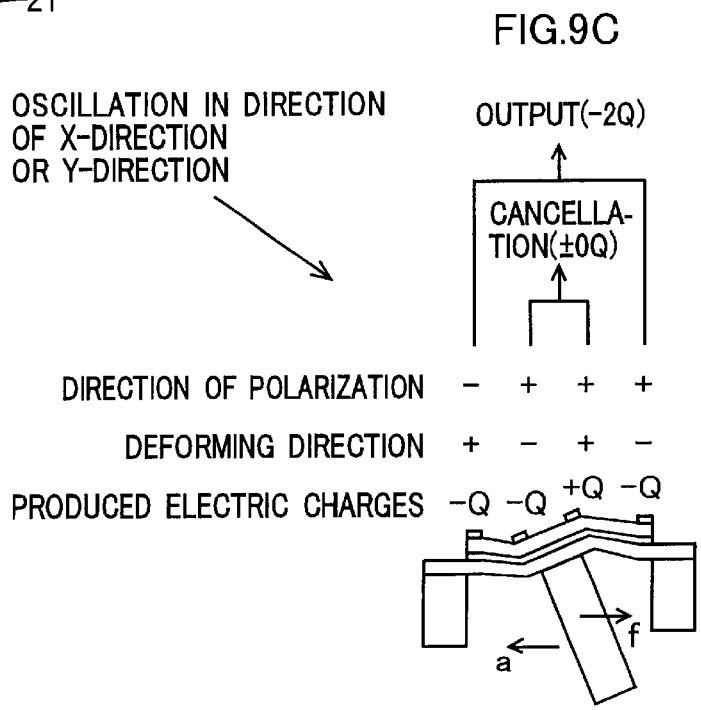

On the other hand, the method of employing the electrodes of the shape as illustrated in FIG. 7 has an advantage in that fine adjustment is achieved, as compared with the case of forming the electrode like a comb. It is determined according to the use of the three-axis sensor which kind of the electrodes should be selected.

There are two techniques for performing the trimming, namely, one is to cut a portion located at the side of the operating member 1 or the support 2 of the upper electrode 10 along the circumference of a circle, the center of which is an origin (O), as illustrated in FIG. 7. The other is to cut the electrode along a line segment drawn from the origin (O) in the circle to a point on the circumference thereof.

In the first case of cutting a portion located at the side of the support 2 of the upper electrode 10 along the circumference of a circle, the center of which is an origin (O), the excitation output largely varies with the area of the cut portion. As a result, trimming processing is achieved with high sensitivity. Therefore, this is suitable for the case of adjusting the excitation output within a large range. On the other hand, in a second case of cutting a portion, which is located at the side of the operating member 1, of the upper electrode 10 along the circumference of a circle, the center of which is an origin (O), the excitation output slightly varies with the area of the cut portion. Thus, trimming processing is achieved with low sensitivity. Therefore, this is suitable for the case of performing fine adjustment of the excitation output. The sensitivity in the case of cutting the electrode along a line segment drawn from the origin (O) in the circle to a point on the circumference thereof has an intermediate level between the levels of the sensitivity in the first and second cases.

According to the methods of the present invention, when the device is oscillated by using one of the X-axis, Y-axis, and Z-axis as an excitation axis, electric charges respectively produced in two piezoelectric elements, which are placed at the positions symmetric with respect to the operating member, among the piezoelectric elements corresponding the axes other than the excitation axis, can be completely canceled. Thus, noise caused correspondingly to the axes other than the excitation axis is suppressed. Consequently, the detecting precision of the sensor can be enhanced.

Further, the trimming is usually performed by using a laser. However, it is necessary to perform the trimming with good precision to accurately perform the positioning of parts. This operation is very hard to achieve. When trimming processing is performed according to the method of the present invention on a three-axis sensor having piezoelectric elements formed in the same place, it is sufficient to perform the positioning only once. Thus, the working efficiency can be enhanced.

Incidentally, the method for adjusting the sensitivity of a sensor device can be applied to a single-axis sensor. However, in the case of a single-axis sensor having the constitution obtained by extracting only one axis from the three-axis sensor, for instance, in the case of a single-axis sensor having only elements for detecting an acceleration component in the X-axis, if the excitation outputs corresponding to the Y-direction and Z-direction are detected, it cannot be achieved that only the excitation output corresponding to the X-direction is measured with good precision.

Hereinafter, the present invention will be described in detail still more by referring to the embodiments shown in the accompanying drawings. The present invention is, however, not limited thereto.

First Embodiment

Figure 1B:
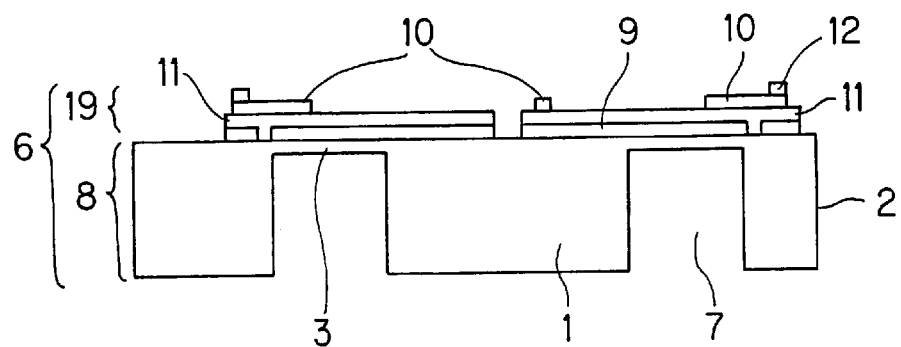
FIG. 1B is a sectional diagram taken through line A–A' of FIG. 1A.
Figure 2A:
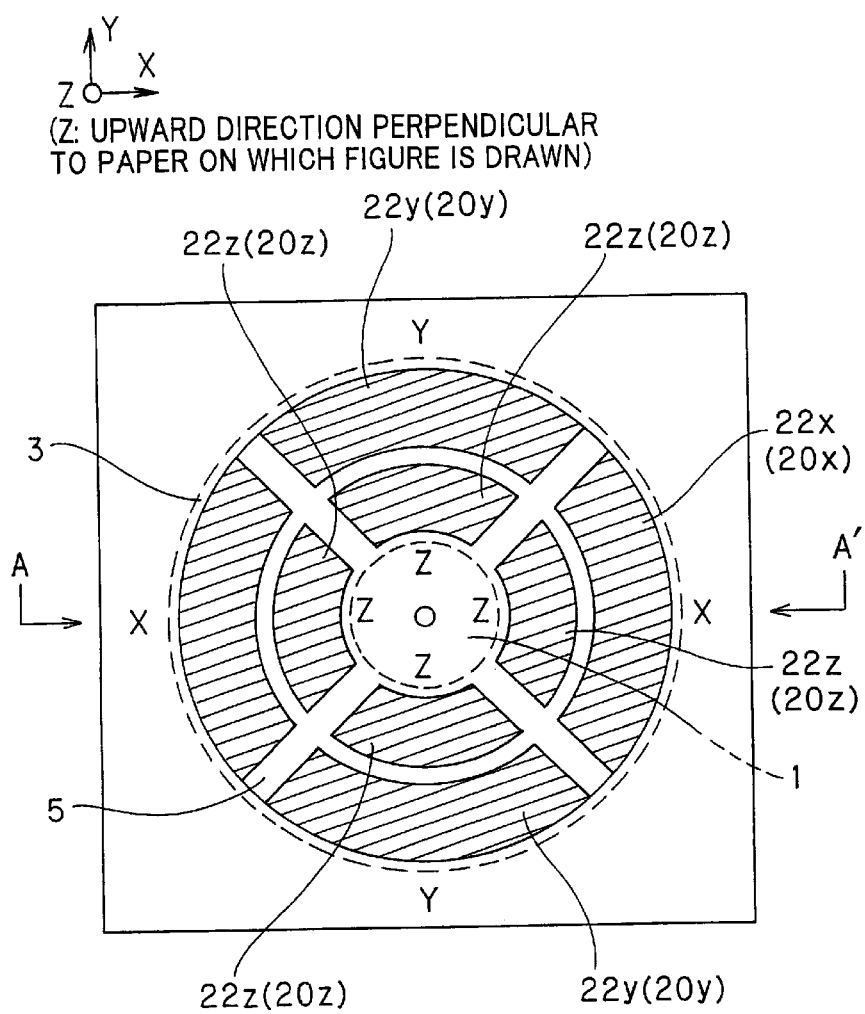
FIG. 2A is a plan diagram illustrating an operation of the three-axis sensor.
Figure 2B:
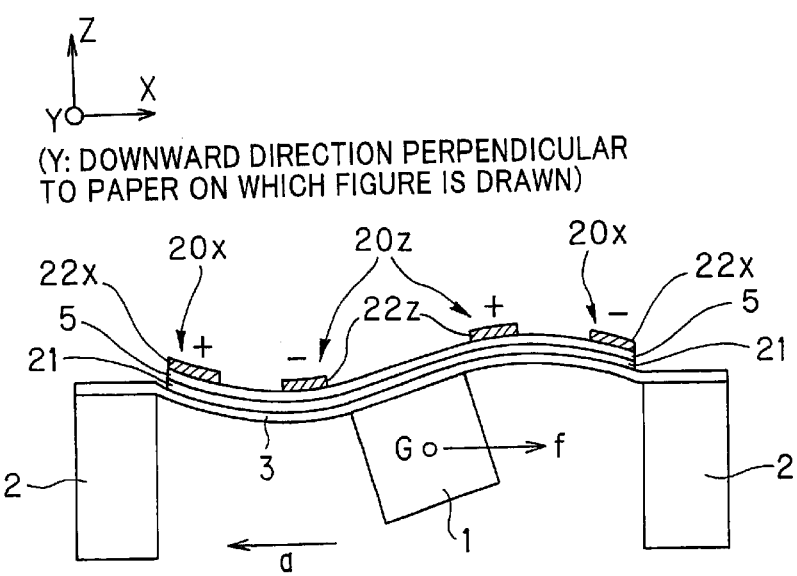
FIG. 2B is a longitudinally sectional diagram illustrating an operation of the three-axis sensor.

First, noise corresponding to axes other than the excitation axis was reduced by performing trimming processing on electrodes corresponding to the X-direction in a three-axis sensor. As shown in FIG. 1, the three-axis sensor had a basement 8 provided in a state in which a weight serving as an operating member 1 was placed by being suspended by a flexible substrate 3 put over a hollow portion 7. Further, the three-axis sensor had a piezoelectric material 11 placed on this basement 8 in such a manner as to be sandwiched between lower electrodes 9 and upper electrodes 10. Incidentally, the lower electrodes 9 and the piezoelectric material 11 were formed in such a manner as to cover the entire flexible substrate 3. A pair of elements for detecting an acceleration component in the X-direction, a pair of elements for detecting an acceleration component in the Y-direction, and a pair of elements for detecting an acceleration component in the Z-direction were provided by forming a pair of electrodes 13 corresponding to the X-direction, a pair of electrodes 14 corresponding to the Y-direction, and a pair of electrodes 15 corresponding to the Z-direction on this piezoelectric material 11. Incidentally, regarding the pair of the electrodes 13 corresponding to the X-direction and the pair of the electrodes 14 corresponding to the Y-direction, the electrodes of each of these pairs were separated from each other. Differently from this, the electrodes 15 of the pair corresponding to the Z-direction were connected to each other. Further, in the case of the three-axis of this embodiment, the upper electrodes 10 made of gold, the lower electrodes 9 made of platinum, the piezoelectric material 11 made of PZT, and circuit (pattern) and bonding pads made of silver were used.

The capacitance of one (hereunder also indicated by "X1") of the elements of the pair corresponding to the X-direction before the trimming (see FIG. 3A) when oscillated in the Z-direction (30 mV corresponds to 10 ms$^{-2}$.) was 279 pF. The excitation output thereof was 120 mV. Further, when oscillated in the Z-direction, the capacitance of the other (hereunder also indicated by "X2) of the elements of the pair corresponding to the X-direction was 286 pF. The excitation output thereof was 131 mV. Thus, the total capacitance of all of the elements of the pair corresponding to the X-direction was 565 pF. The excitation output thereof was 7.5 mV. That is, noise having a magnitude of 7.5 mV, which was caused corresponding to the other axes by the excitation in the Z-direction, was observed.

In the aforementioned three-axis sensor, trimming processing was performed on the element X2 so that the shape of the electrode 13b corresponding to the element X2 for the X-direction was axially symmetric with respect to the X-axis, and so that the difference between the absolute values of the excitation outputs of the elements of the pair corresponding to the X-axis became small. The reason for making the shape axially symmetric with respect to the X-axis was to reduce noise due to a component force in the Y-direction in the elements of the pair corresponding to the X-direction. The level of trimming to be performed was determined according to preliminarily determined amounts of portions to be cut and of a decrease in sensitivity.

The excitation output of all of the elements of the pair corresponding to the X-direction when oscillated in the Z-direction after trimming processing was 0 mV. Thus, the noise to the elements of the pair corresponding to the X-axis and caused corresponding to the axes other than the X-axis was reduced.

Incidentally, in this embodiment, trimming processing was performed by using a laser.

Second Embodiment

The trimming was performed on the electrodes 15 corresponding to the Z-direction of the three-axis sensor used in the first embodiment. Thus, noise to the elements of the pair corresponding to the Z-direction and to be caused corresponding to the axes other than the Z-axis was reduced.

The capacitance of the elements of the pair corresponding to the Z-direction before trimming processing (see FIG. 4A) when oscillated in the X-direction (30 mV corresponds to 10 ms$^{-2}$.) was 640 pF. The excitation output thereof was 6.7 mV. That is, noise having a magnitude of 6.7 mV caused corresponding to the other axes by the excitation in the X-direction was observed.

In the aforementioned three-axis sensor, trimming processing was performed on the element so that the difference between the absolute values of the excitation outputs of the elements of the pair corresponding to the Z-axis when oscillated in the X-direction became small. The level of trimming to be performed was determined, similarly as in the case of the first embodiment. Moreover, which of the elements (one of which is indicated by "Z1" and the other of which is also indicated by "Z2" hereunder) of the pair corresponding to the Z-direction should undergo trimming processing was determined as follows by the signs of electric charges generated in all of the elements of the pair corresponding to the Z-direction and all of the elements of the pair corresponding to the X-direction when oscillated in the X-direction. Namely, if the signs of both of the electric charges were the same, the trimming was performed on the element Z1. Conversely, if the signs were different from each other, the trimming was performed on the element Z2. In the case of this embodiment, the signs of both the electric charges were opposite to each other. Thus, the trimming was performed on the electrode 15a (Z2).

The excitation output of all of the elements of the pair corresponding to the Z-direction when oscillated in the X-direction after trimming processing was 0 mV. Thus, the noise to the elements of the pair corresponding to the Z-axis and caused corresponding to the axes other than the Z-axis was reduced.

Incidentally, in this embodiment, trimming processing was performed, similarly as in the first embodiment.

According to the present invention, in the case that a three-axis sensor is oscillated by using one of the X-axis, Y-axis, and Z-axis as an excitation axis, among the piezoelectric elements corresponding to the axes other than the excitation axis, electric charges produced in the two piezoelectric elements placed at positions, which are symmetric with respect to a operating member, are completely canceled. Thus, noise to the piezoelectric elements corresponding to the axes other than the excitation axis is suppressed. Consequently, the detecting precision of the sensor can be enhanced. Further, in the case of applying the method of the present invention to a single-axis sensor, the detecting precision corresponding to the excitation output in the direction of the primary axis is improved by decreasing noise caused by oscillating the sensor device in the direction corresponding to each of the other axes.

Although the preferred embodiments of the present invention have been described above, it should be understood that the present invention is not limited thereto and that other modifications will be apparent to those skilled in the art without departing from the spirit of the invention.

The scope of the present invention, therefore, should be determined solely by the appended claims.

What is claimed is:

1. A method for adjusting sensitivity of an acceleration sensor device having an acceleration detecting device comprising a pair of piezoelectric elements for detecting an externally acting acceleration along a first axis direction, said method comprising the step of:

changing an electric output of said piezoelectric elements by changing electrostatic capacity of said acceleration sensor device, such that a difference between absolute values of excitation outputs respectively generated in said piezoelectric elements of said acceleration detecting device become small when said acceleration sensor device is oscillated in a second axis direction perpendicular to the first axis direction.

2. The method for adjusting sensitivity of an acceleration sensor device according to claim 1, wherein said acceleration detecting device comprises:

a weight;
    a support, installed around said weight, having a hollow portion;
    a flexible substrate put on said support so that said weight is suspended in said hollow portion of said support; and
    a pair of piezoelectric elements.

3. The method for adjusting sensitivity of an acceleration sensor device according to claim 2, wherein two pairs of said piezoelectric elements are provided in said acceleration sensor device corresponding to two orthogonal axes.

4. The method for adjusting sensitivity of an acceleration sensor device according to claim 2, wherein three pairs of said piezoelectric elements are provided in said acceleration sensor device corresponding to three orthogonal axes.

5. A method for adjusting sensitivity of an acceleration sensor device having an acceleration detecting device comprising a pair of piezoelectric elements for detecting an externally acting acceleration, said method comprising the step of:

changing an electric output of said piezoelectric elements by changing electrostatic capacity of said acceleration sensor device, said acceleration detecting device comprising:

a weight;
    a support, installed around said weight, having a hollow portion;
    a flexible substrate put on said support so that said weight is suspended in said hollow portion of said support; and
    a pair of piezoelectric elements;
    wherein when said acceleration detecting device is adapted to detect an acceleration component in the X-direction or the Y-direction, the electrostatic capacity is changed so that a difference between absolute values of excitation outputs respectively generated in said piezoelectric elements of said acceleration detecting device become small when said acceleration sensor device is oscillated in the Z-direction, and when said acceleration detecting device is adapted to detect an acceleration component in the Z-direction, the electrostatic capacity is changed so that a difference between absolute values of excitation outputs respectively generated in said piezoelectric elements of said acceleration detecting device becomes small when said acceleration sensor device is oscillated in the X-direction or the Y-direction.

6. The method for adjusting sensitivity of an acceleration sensor device according to claim 5, further comprising the step of determining which of the electrodes respectively corresponding to said piezoelectric elements of the pair for detecting an acceleration component in the Z-direction should undergo trimming processing, according to whether or not an excitation output generated in said piezoelectric elements for detecting an acceleration component in the Z-direction and an excitation output generated in said piezoelectric elements for detecting an acceleration component in the X-direction are different in sign from each other when said acceleration sensor device is oscillated in the X-direction, and according to whether or not an excitation output generated in said piezoelectric elements for detecting an acceleration component in the Z-direction and an excitation output generated in said piezoelectric elements for detecting an acceleration component in the Y-direction are different in sign from each other when said acceleration sensor device is oscillated in the Y-direction.

7. The method for adjusting sensitivity of an acceleration sensor device according to claim 6, wherein a part of said electrode is laced at a portion, which corresponds to said support or to a operating member, of a piezoelectric material corresponding to said piezoelectric element of the pair, and wherein trimming processing is performed at the part of said electrode.

8. The method for adjusting sensitivity of an acceleration sensor device according to claim 7, wherein an electrode corresponding to said piezoelectric element having a larger excitation output between the pair of said piezoelectric elements, whose excitation outputs are made to be different from each other, has a part placed on a portion, which corresponds to said support or to said operating member, of said piezoelectric element.

9. The method for adjusting sensitivity of an acceleration sensor device according to claim 7, wherein said electrode is formed like a comb and has bottom land portions each formed on said portion, which corresponds to said support or to said operating member, of said piezoelectric material, and has tooth-like portions each projected from a corresponding one of said bottom land portions and each extended from a portion, which corresponds to said hollow portion, of said piezoelectric material, and wherein said bottom land portions provided between adjacent ones of said tooth-like portions are cut by performing trimming processing.

10. The method for adjusting sensitivity of an acceleration sensor device according to claim 7, further comprising the step of performing trimming processing on a portion, which is provided at the side of said operating member or of said support, of said electrode along a circumference of a circle, the center of which is an origin (O).

11. The method for adjusting sensitivity of an acceleration sensor device according to claim 6, further comprising the step of performing trimming processing on said electrode along a line segment connecting an origin (O) to a point provided on a circumference of a circle, the center of which is the origin (O).

12. The method for adjusting sensitivity of an acceleration sensor device according to claim 5, further comprising the steps of forming an adjusting capacitance, which is connected to an electrode corresponding to each of said piezoelectric elements of the pair, at a portion, which corresponds to said support, of the piezoelectric material of a corresponding one of said piezoelectric elements of the pair, and then trimming said adjusting capacitance.

13. The method for adjusting sensitivity of an acceleration sensor device according to claim 12, wherein said adjusting capacitance is connected to an electrode corresponding to said piezoelectric element having a larger excitation output between said piezoelectric elements of the pair, whose excitation outputs are made to be different from each other.

14. A method for adjusting sensitivity of an acceleration sensor device having an acceleration detecting device comprising a pair of piezoelectric elements for detecting an externally acting acceleration, said method comprising the step of:

changing an electric output of said piezoelectric elements by changing electrostatic capacity of said acceleration sensor device, said acceleration detecting device comprising:
a weight;
a support, installed around said weight, having a hollow portion;
a flexible substrate put on said support so that said weight is suspended in said hollow portion of said support; and
a pair of piezoelectric elements;
wherein when said acceleration detecting device is adapted to detect an acceleration component in the X-direction, the electrostatic capacity is changed so that shapes of said piezoelectric elements are symmetric with respect to the X-axis and so that a difference between absolute values of excitation outputs respectively generated in said piezoelectric elements of said acceleration detecting device becomes small when said acceleration sensor device is oscillated in the Z-direction, and when said acceleration detecting device is adapted to detect an acceleration component in the Y-direction, the electrostatic capacity is changed so that shapes of said piezoelectric elements are symmetric with respect to the Y-axis and so that a difference between absolute values of excitation outputs respectively generated in said piezoelectric elements of said acceleration detecting device becomes small when said acceleration sensor device is oscillated in the Z-direction.

15. The method for adjusting sensitivity of an acceleration sensor device according to claim 6, further comprising the step of determining which of the electrodes respectively corresponding to said piezoelectric elements of the pair for detecting an acceleration component in the Z-direction should undergo trimming processing, according to whether or not an excitation output generated in said piezoelectric elements for detecting an acceleration component in the Z-direction and an excitation output generated in said piezoelectric elements for detecting an acceleration component in the X-direction are different in sign from each other when said acceleration sensor device is oscillated in the X-direction, and according to whether or not an excitation output generated in said piezoelectric elements for detecting an acceleration component in the Z-direction and an excitation output generated in said piezoelectric elements for detecting an acceleration component in the Y-direction are different in sign from each other when said acceleration sensor device is oscillated in the Y-direction.

16. The method for adjusting sensitivity of an acceleration sensor device according to claim 15, wherein a part of said electrode is placed at a portion, which corresponds to said support or to a operating member, of a piezoelectric material corresponding to said piezoelectric element of the pair, and wherein trimming processing is performed at the part of said electrode.

17. The method for adjusting sensitivity of an acceleration sensor device according to claim 16, wherein an electrode corresponding to said piezoelectric element having a larger excitation output between the pair of said piezoelectric elements, whose excitation outputs are made to be different from each other, has a part placed on a portion, which corresponds to said support or to said operating member, of said piezoelectric element.

18. The method for adjusting sensitivity of an acceleration sensor device according to claim 16, wherein said electrode is formed like a comb and has bottom land portions each formed on said portion, which corresponds to said support or to said operating member, of said piezoelectric material, and has tooth-like portions each projected from a corresponding one of said bottom land portions and each extended from a portion, which corresponds to said hollow portion, of said piezoelectric material, and wherein said bottom land portions provided between adjacent ones of said tooth-like portions are cut by performing trimming processing.

19. The method for adjusting sensitivity of an acceleration sensor device according to claim 16, further comprising the step of performing trimming processing on a portion, which is provided at the side of said operating member or of said support, of said electrode along a circumference of a circle, the center of which is an origin (O).

20. The method for adjusting sensitivity of an acceleration sensor device according to claim 15, further comprising the step of performing trimming processing on said electrode along a line segment connecting an origin (O) to a point provided on a circumference of a circle, the center of which is the origin (O).

21. The method for adjusting sensitivity of an acceleration sensor device according to claim 14, further comprising the steps of forming an adjusting capacitance, which is connected to an electrode corresponding to each of said piezoelectric elements of the pair, at a portion, which corresponds to said support, of the piezoelectric material of a corresponding one of said piezoelectric elements of the pair, and then trimming said adjusting capacitance.

22. The method for adjusting sensitivity of an acceleration sensor device according to claim 21, wherein said adjusting capacitance is connected to an electrode corresponding to said piezoelectric element, having a larger excitation output between said piezoelectric elements of the pair, whose excitation outputs are made to be different from each other.

* * * * *